May 28, 1940.　　　A. S. MITCHELL　　　2,202,710
BATT FABRICATING AND CUSHION MAKING APPARATUS
Filed Feb. 4, 1937　　　8 Sheets-Sheet 1

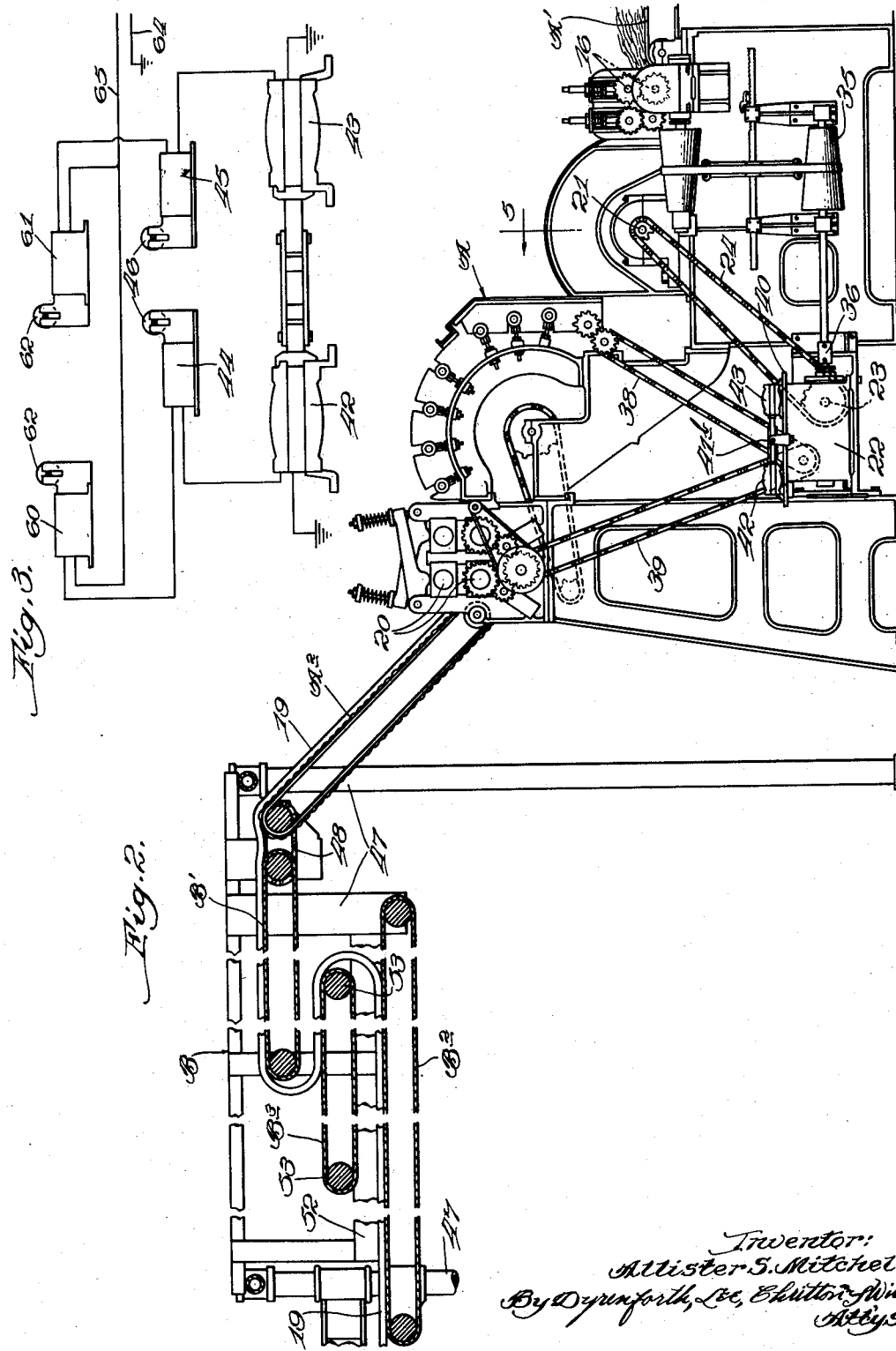

May 28, 1940. A. S. MITCHELL 2,202,710
BATT FABRICATING AND CUSHION MAKING APPARATUS
Filed Feb. 4, 1937 8 Sheets-Sheet 3
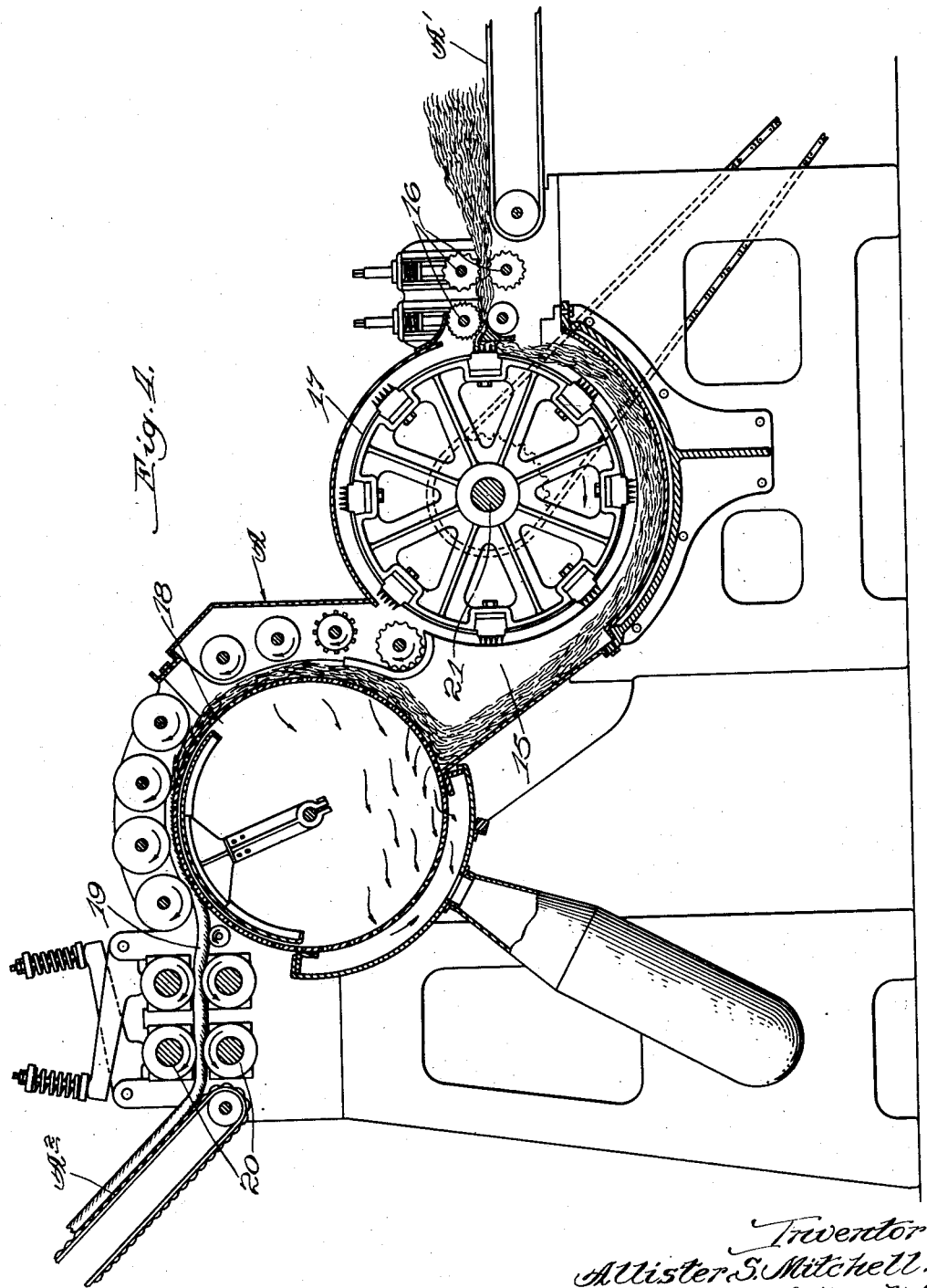

May 28, 1940. A. S. MITCHELL 2,202,710
BATT FABRICATING AND CUSHION MAKING APPARATUS
Filed Feb. 4, 1937 8 Sheets-Sheet 4
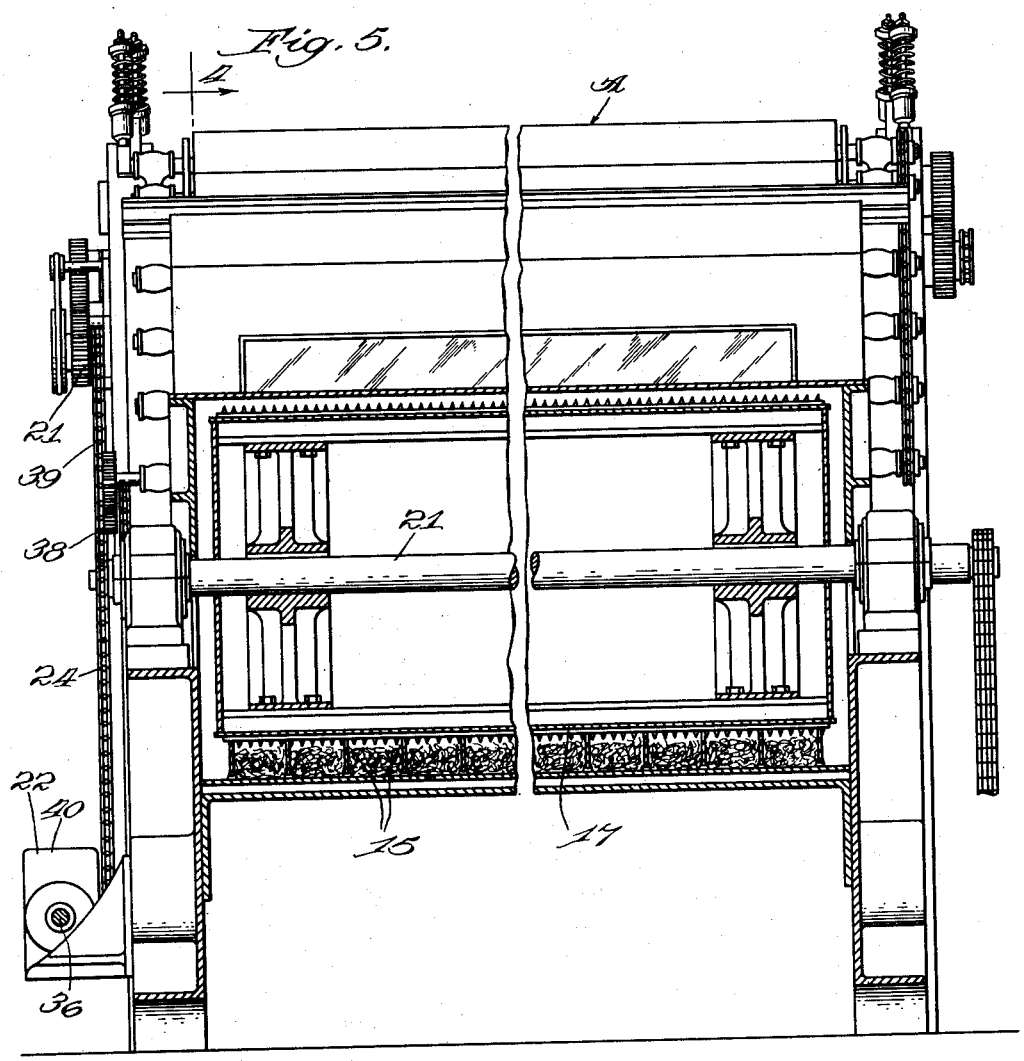
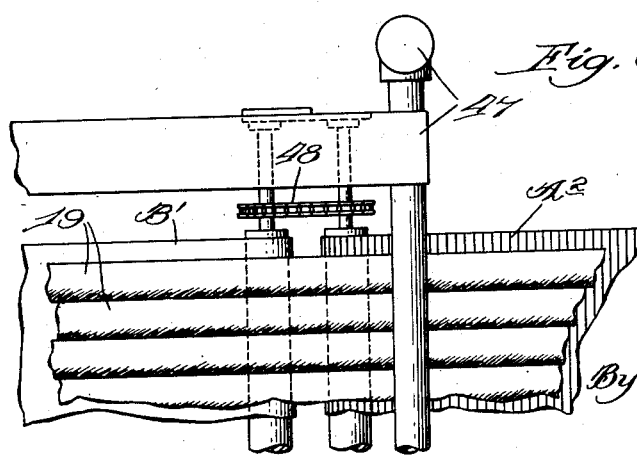

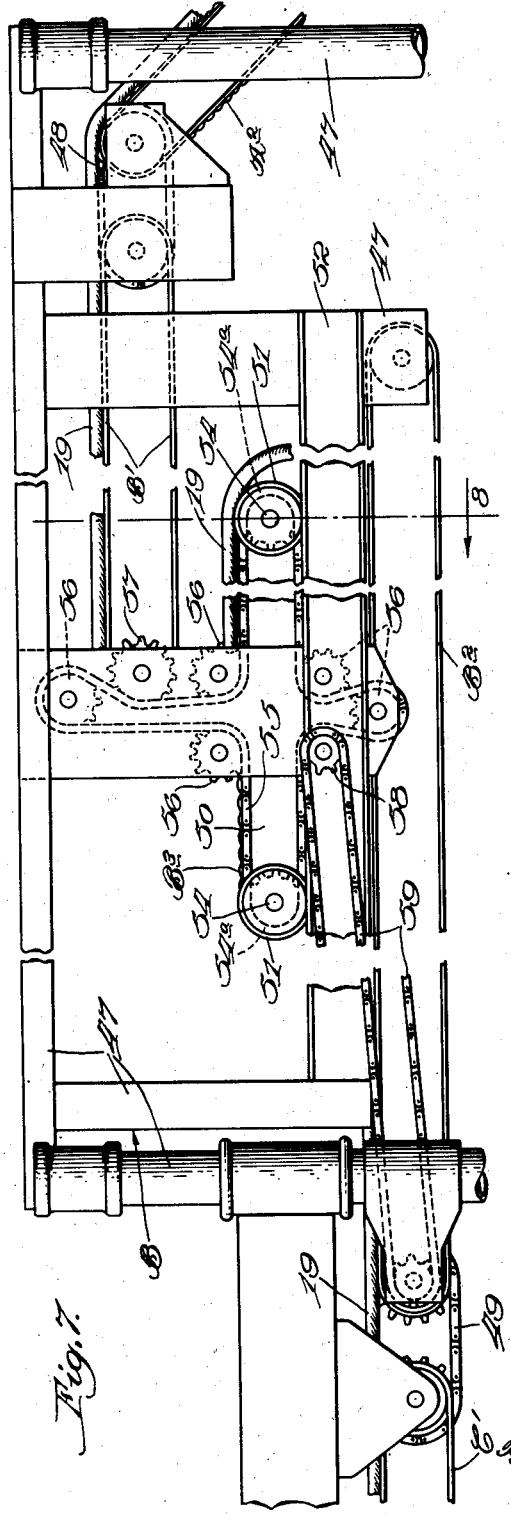
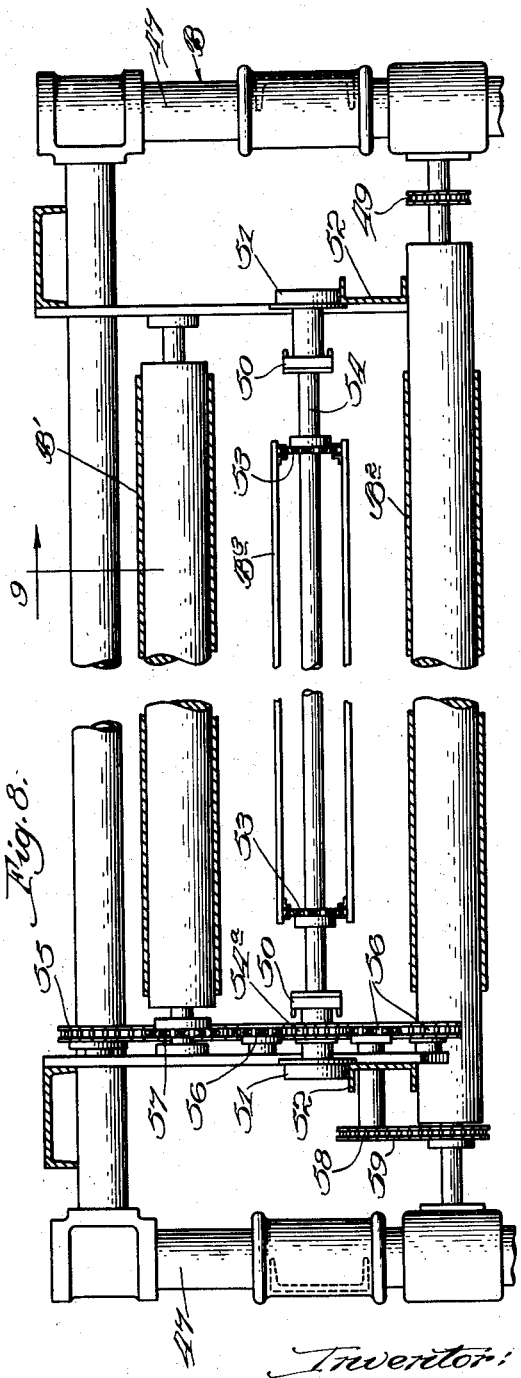

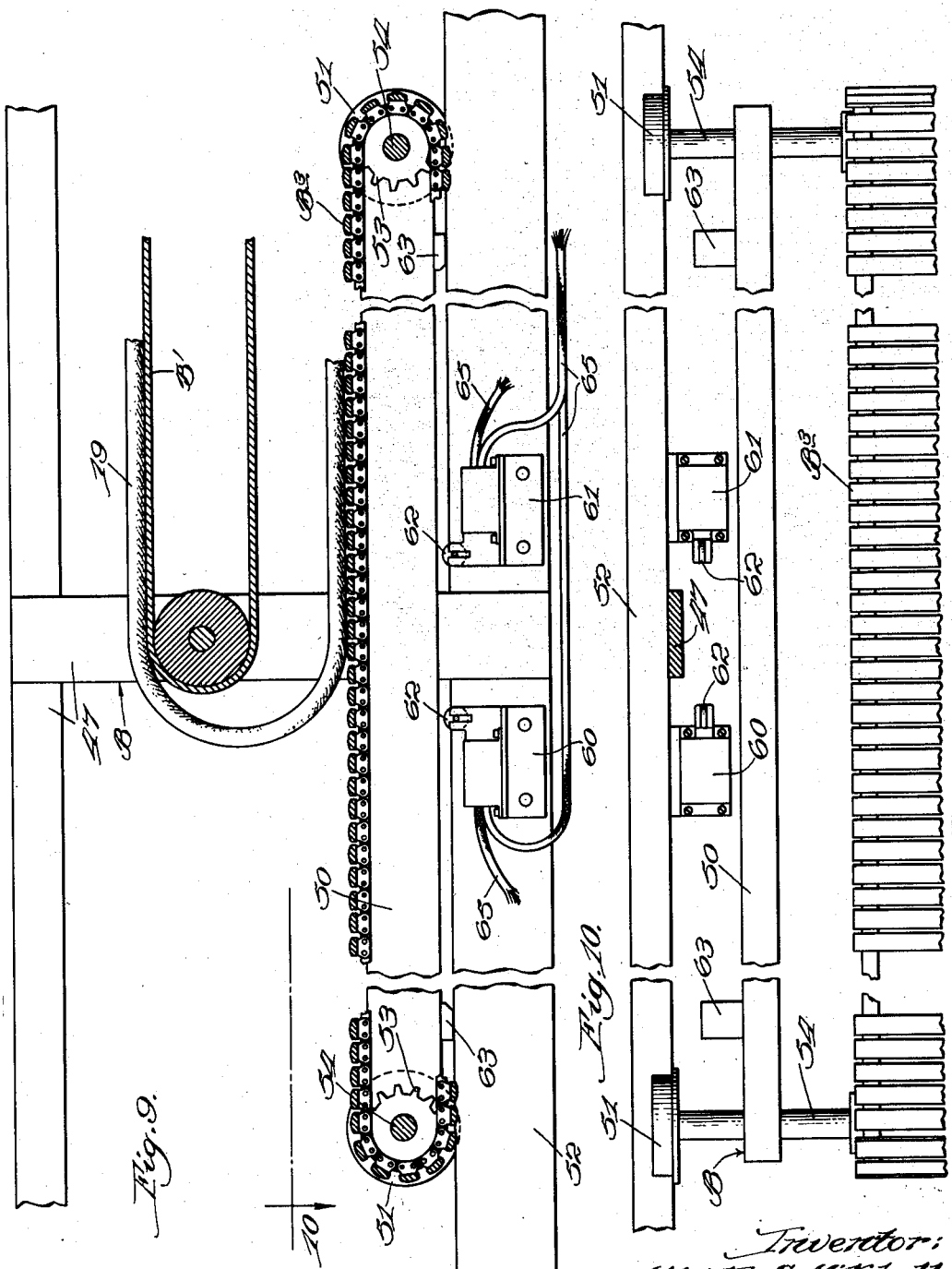

May 28, 1940. A. S. MITCHELL 2,202,710
BATT FABRICATING AND CUSHION MAKING APPARATUS
Filed Feb. 4, 1937 8 Sheets-Sheet 7

Inventor:
Allister S. Mitchell.
By Dynenforth, Lee, Chritton & Wiles
Attys.

May 28, 1940.      A. S. MITCHELL      2,202,710
BATT FABRICATING AND CUSHION MAKING APPARATUS
Filed Feb. 4, 1937      8 Sheets-Sheet 8
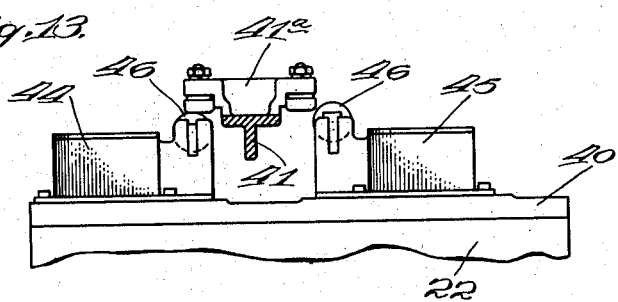
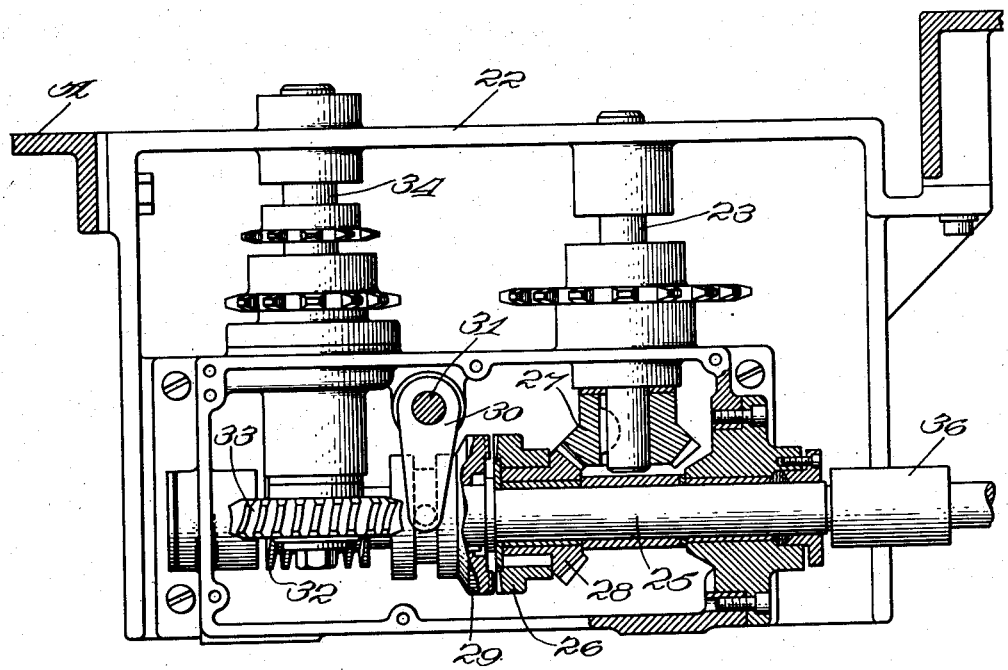

Patented May 28, 1940

2,202,710

UNITED STATES PATENT OFFICE 2,202,710

BAT FABRICATING AND CUSHION MAKING APPARATUS

Allister S. Mitchell, Detroit, Mich., assignor to National Automotive Fibres, Inc., Detroit, Mich., a corporation of Delaware Application February 4, 1937, Serial No. 124,107

18 Claims. (Cl. 19—68)

This invention relates to an improved bat-fabricating mechanism and upholstery making apparatus for utilizing said bats, and more particularly to a compensating device disposed between the fabricating mechanism and upholstery making apparatus for controlling the operation of the fabricating mechanism according to the bat-demands of the upholstery making apparatus.

The primary object of the invention is to provide an automatic compensating device which will enable one of the machines to continue to operate during brief stoppages of the companion machine.

A further object of the invention is to provide an automatic compensating device in the form of a conveyer which is adapted to store up or dispense a supply of bats so that it is not necessary to stop both of the machines simultaneously.

The invention is illustrated in a preferred embodiment in the accompanying drawings, in which—

Figure 1:
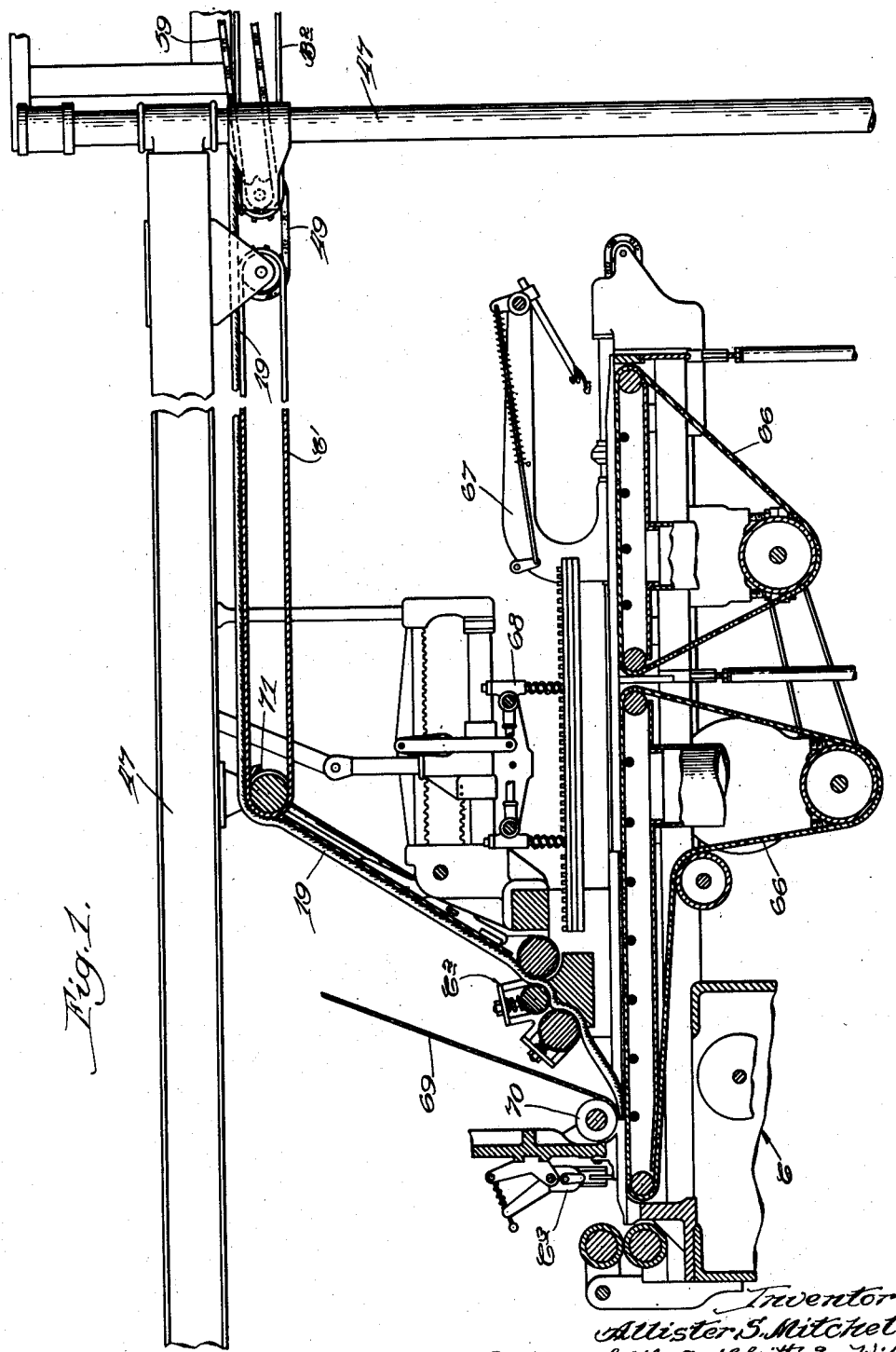
Figure 11:
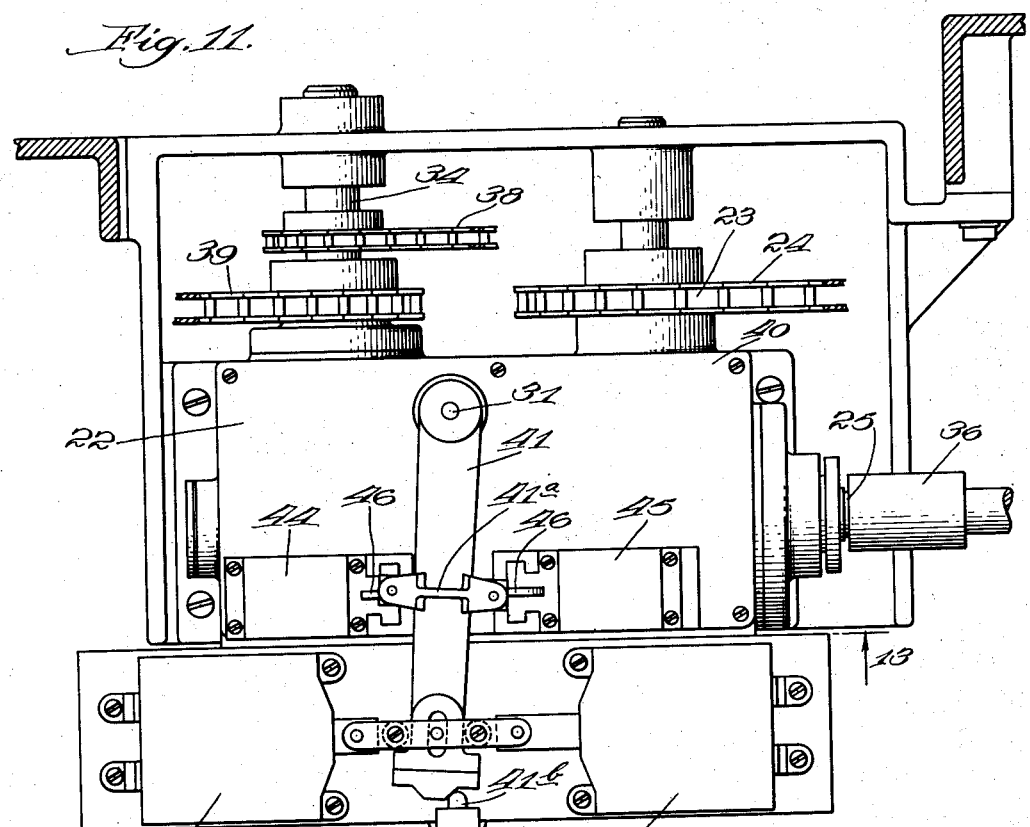
Figure 12:
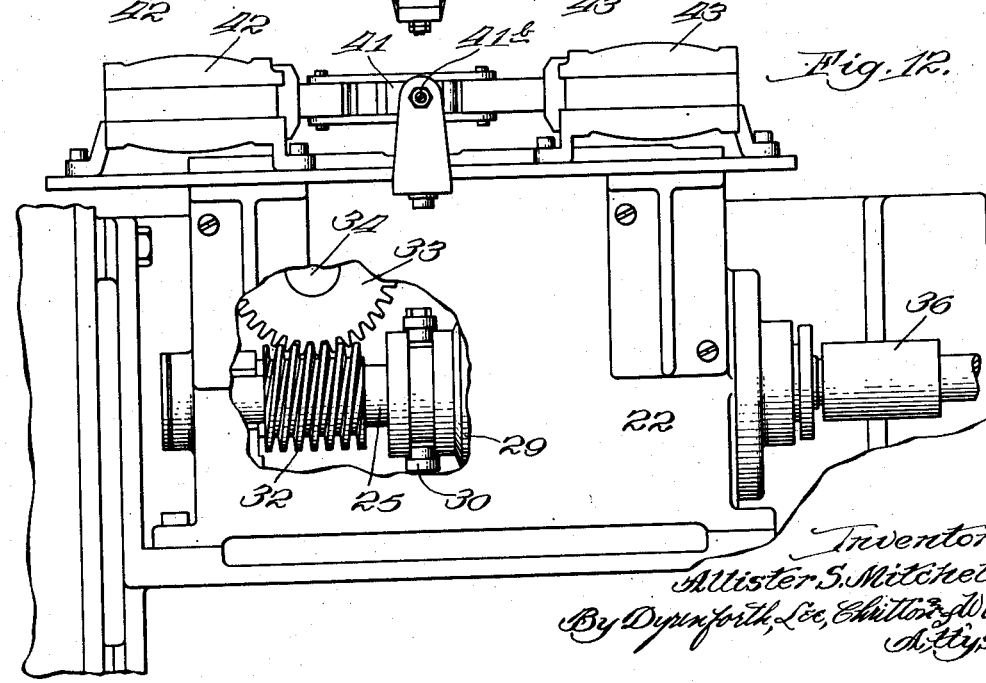

Figure 1 is a broken longitudinal sectional view of upholstery making apparatus adapted to receive continuous lengths of bats and sew them between a lining fabric and pre-cut cover fabrics to form cushions adapted for use in automobiles and the like; Fig. 2, a broken side elevational view of bat-fabricating mechanism, adapted to form a supply of cotton fibers into continuous bat lengths, and a compensating device for receiving the bats from the fabricating mechanism; Fig. 3, a diagrammatic wiring plan of the switches and solenoids for operating the clutch; Fig. 4, a longitudinal sectional view of the bat-fabricating mechanism taken as indicated at line 4 of Fig. 5; Fig. 5, a broken transverse sectional view of the bat-fabricating machine taken as indicated at line 5 of Fig. 2; Fig. 6, a fragmentary plan view showing bats passing from the bat-fabricating conveyer to the compensating device; Fig. 7, a broken side elevational view of the compensating device; Fig. 8, a broken transverse sectional view of the compensating device taken as indicated at line 8 of Fig. 7; Fig. 9, a broken longitudinal sectional view of the compensating device taken as indicated at line 9 of Fig. 8; Fig. 10, a fragmentary plan view taken as indicated at line 10 of Fig. 9; Fig. 11, a broken plan view of the gear box; Fig. 12, a broken elevational view of the gear box; Fig. 13, a broken sectional view taken as indicated at line 13 of Fig. 11; and Fig. 14, a broken plan view, partly in section, of the gear box with the cover removed.

In the embodiment illustrated A designates a bat-fabricating mechanism provided with a supply conveyer A' for receiving a supply of cotton material, and having a delivery conveyer $A^2$; B, a compensating device having an upper movable conveyer B', a lower conveyer $B^2$ and an intermediate traversing conveyer $B^3$; and C, upholstery making apparatus provided with a bat receiving conveyer C', bat severing mechanism $C^2$ and sewing mechanism $C^3$.

The bat-fabricating mechanism A, illustrated in Figs. 2, 4, and 5, is described in detail in my co-pending application Serial No. 94,091, filed August 3, 1936. The machine is adapted to take loose cotton material and form it into a bat of desired widths, such bat being suitable for use in the continuous manufacture of trim panels for the interiors of automobile bodies, as described in my patent application No. 63,968, filed February 14, 1936, or, if desired, a plurality of bats of desired width may be simultaneously fabricated in form suitable for use in filling the pleats of upholstery, such as automobile cushions. The plurality of bats thus fabricated being of sufficient strength to enable them to be drawn through multi-pleater cushion-making machines of the general character shown, for example, in my Patent No. 1,918,284, granted July 18, 1933.

It may be stated here that the bat-fabricating machine illustrated in the accompanying drawings is provided in the channel, through which the masticated fiber passes, with a series of dividers 15 which are laterally adjustable; and when these dividers are employed a plurality of comparatively narrow bats, in parallel relation, are simultaneously formed. On the other hand, when the dividers are removed from the machine, a single bat of sufficient width for use in the manufacture of trim panels, for example, may be formed.

As will be understood from reference to Figs. 4 and 5, the bat-fabricator is equipped with a supply-conveyer A' which serves to deliver fibrous material to feed rolls 16. The material is then picked up by a picker-cylinder 17 and after being picked, or carded, passes to a rotating suction-cylinder 18, which, in conjunction with suitable rolls, serves to form a continuous bat or bats 19 which after passing through delivery rolls 20 are discharged on the conveyer $A^2$ which is positively driven in timed relation to the suction-cylinder 18 and rolls 20. The bat-fabricating mechanism receives its power from the picker-cylinder shaft 21 which is positively driven by a motor, not shown. As will be understood by reference to Figs. 2 and 14 the machine is provided with a gear box 22 in which is journalled a jack shaft 23 which is continuously driven from the shaft 21 by means of a sprocket chain 24. A shaft 25 is journalled within the gear box at right angles to the shaft 23 and supports one face 26 of a clutch which is driven from the shaft 23 by means of a pair of bevelled gears 27 and 28. The other face of the clutch 29 is slidably keyed to the shaft 25 and may be shifted by means of a throw out arm 30 mounted on a shaft 31. The shaft 25 is further provided with a worm 32 which is adapted to drive a gear 33 on a jack shaft 34 when the clutch faces 26 and 29 are thrown into engagement to drive the shaft 25. As shown in Fig. 2, a speed control mechanism 35 is coupled to the shaft 25 at 36 and serves to drive the receiving rolls 16. The rolls cooperating with the suction-cylinder are driven from the shaft 34 by means of a sprocket chain 38, and the delivery rolls 20 and conveyer A² are also driven from the shaft 34 by means of sprocket chain 39.

As shown in Fig. 14, the shaft 31, supporting the clutch throw out arm extends upwardly through the cover 40 of the gear box and is provided with an operating arm 41 which may be moved to the stop position by means of a solenoid 42 or returned to the start position by means of a solenoid 43. The top of the gear box is further provided with a pair of switches 44 and 45 which serve to open the solenoid circuit as soon as the solenoid has served to throw the arm 41. This is accomplished by a shoe 41ᵃ mounted on the arm 41 which serves to depress or release alternately one of the switch rolls 46 as will be readily understood. The end of the arm 41 is in the form of a cam which bears against a spring plunger 41ᵇ which serves to hold the arm in the position in which it is left by the solenoids.

The compensating device B is disposed between the bat-fabricating machine A and the upholstery making machine C, as shown in Figs. 2 and 7. The device is supported on a suitable frame 47 in which the endless conveyer belt B' is journalled. The conveyer belt is provided at each end with shafts provided with sprocket wheels and is positively driven by the conveyer A² by means of a sprocket chain 48. The lower endless belt conveyer B² is also journalled in the frame 47 and is positively driven by the conveyer C' by means of a sprocket chain 49.

The traversing endless belt conveyer B³ is mounted on a carriage 50 provided with freely rotatable flanged wheels 51 adapted to roll over rail members 52 fixedly mounted on the frame 47. The conveyer belt B³, as shown in Fig. 8, is carried on sprocket wheels 53 which are fixed to shafts 54 on which are freely journalled the wheels 51. The shafts 54 are provided with fixed sprocket wheels 54ᵃ to receive an endless sprocket chain 55 which, as shown in Fig. 7, passes around idler sprockets 56 and makes driving contact with sprocket 57 positively driven by the conveyer B', and also makes driving contact with a driving sprocket 58 which is positively driven by the conveyer C' through the medium of sprocket chain 49 and sprocket chain 59.

By the arrangement illustrated, it will be seen that so long as the driving gears 57 and 58 rotate at the same peripheral speed there will be no movement of the conveyer frame 50 relative to the supporting frame 47. However, if the conveyer C', for example, is stopped, the gear 58 will stop and the continued driving by means of the gear 57 will cause the carriage 50 to move to the right, as viewed in Fig. 7, and thereby elongate the effective carrying surface of the conveyer B³. In the same manner, of course, if rotation of gear 57 is stopped and gear 58 continues to drive, the carriage 50 will move to the left, as viewed in Fig. 7, and will continue to discharge the bat 19 onto the conveyer B².

As shown in Fig. 9, a pair of limit switches 60 and 61 are mounted on the frame 47 and are provided with depressible operating rollers 62 disposed in the path of lugs 63 depending from the frame 50. These limit switches are adapted to energize their corresponding solenoids and thereby actuate the clutch in the gear box 22 to start and stop the machine.

The wiring diagram is illustrated in Fig. 3. The source of power supply is grounded on one side as indicated at 64 and the other side 65 connects in series, limit switches 60, circuit opening switch 44 and solenoid 42, for throwing out the clutch, and limit switch 61, circuit opening switch 45 and solenoid 43, for throwing in the clutch. The operation of the electrical mechanism is as follows: when the carriage 50 moves to its extreme left position, as viewed in Figs. 7 and 9, one of the lugs 63 will depress the roller of limit switch 61 and energize the solenoid 43 which will draw the arm 41 to the right, as viewed in Fig. 11, and throw the clutch faces 26 and 29 into driving engagement. As the clutch arm 41 flips across to starting position, roller 46 of the circuit opening switch 45 will be depressed to open the circuit and de-energize the solenoid 43. In the same manner, it will be understood that when the carriage 50 moves to its extreme right position, as viewed in Fig. 9, one of the lugs 63 will close the circuit through limit switch 60 and energize the solenoid 42, and as soon as the arm 41 is flipped to the position shown in Fig. 11, the switch 44 will be opened to deenergize solenoid 42.

The compensating device B is adapted to synchronize the work of the bat-fabricating mechanism A with any suitable machine utilizing bats. For the purpose of illustration a multi-pleater C is shown in Fig. 1. Such a machine is described in detail in my Patent No. 1,918,284, dated July 18, 1933. In the operation of such a machine pre-cut cover fabrics are fed seriatim over a suitable bed by means of suction conveyers 66 and piece placing mechanism 67. As the covers advance they are provided with upstanding seam ridges and intervening pleat fullness by the mechanism 68, and the fullness becomes nested within the seam ridges of a lining fabric 69 advancing around a forming roll 70. The cotton batting 19 is advanced to the machine by means of the conveyer C' which is positively driven by means of a bevelled gear 71 which, in turn, is driven by the upholstery making machine. The bats 19 are advanced through the roll C² into the pleats formed in the cover fabric and the cushion is completed by sewing the seam ridges to the lining fabric by means of the sewing mechanism C³.

Usually there is a short open space between the advancing pre-cut covers and in order to prevent a waste of cotton the bat-severing rolls C² are timed in relation to the operation of the piece placing mechanism 67 so as to be stopped and sever the ends of the bats at the end of each pre-cut cover. Feed is resumed in timed relation to the movement of the next advancing cover so that each pleat will be properly filled with cotton but no cotton will extend beyond the covers. The conveyer C' is arranged to stop when the web severing rolls C² stop and as the stoppage is only momentary it is not desirable to stop the bat-fabricating mechanism for each cover interval. The compensating device B makes such frequent stoppages of the bat-fabricating mechanism unnecessary.

The operation of the combined machines and compensating unit, illustrated in Figs. 1 and 2, may be described briefly as follows: during the feed of a single pre-cut cover both the bat-fabricating mechanism and upholstery making apparatus conveyers, $A^2$ and $C'$, respectively, are travelling with the same speed and accordingly there is no movement of the carriage carrying the conveyer $B^3$ relative to the frame 41. The bat severing rolls $C^2$ of the upholstery making machine will then be stopped momentarily to sever the bats and at the same time movement of the conveyer $C'$, sprocket chain 49 and sprocket chain 59 will also be stopped. During this stoppage the bat-fabricating mechanism and its conveyer $A^2$ continues to drive sprocket chain 48 and driving gear 57. This stoppage of gear 58 and continuance of driving gear 57 will cause the carriage 50 to roll to the right, as viewed in Figs. 2 and 7, and batting 19 will be stored up partly on the conveyer $B^2$ and partly on the conveyer $B^3$. When feeding is resumed by the roll $C^2$ and the conveyer $C'$ to conform with the movement of conveyer $A^2$ relative movement of the carriage 50 will again stop with respect to the frame 41. This starting and stopping of the compensating device will continue until the carriage 50 moves far enough to the right, as viewed in Fig. 9, to cause one of the lugs 63 to actuate limit switch 60 and thereby energize the solenoid 42 and throw out the clutch. Opening the clutch faces 26 and 29 will stop rotation of the suction cylinder and conveyer $A^2$ and the carriage 50 will move intermittently to the left until the companion lug 63 will close clutch switch 61 and throw the clutch back into driving engagement to re-start the suction cylinder and conveyer $A^2$. Thus it will be understood that although the upholstery making apparatus C operates intermittently, the compensating mechanism B will take up or dispense a supply of batting so that many less stoppages of the bat forming mechanism will be necessary.

The foregoing detailed description has been given for clearness of understanding only, and no unnecessary limitations should be understood therefrom, but the appended claims should be construed as broadly as permissible, in view of the prior art.

I claim:

1. In apparatus of the character set forth: a bat-fabricating machine provided with feed-means for delivering a continuous bat; an upholstery machine provided with feed-mechanism for receiving said bat; an endless conveyer mounted on a carriage for movement bodily between said machines to convey and support a variable length of bat; and compensating mechanism to control the movement of said carriage, said compensating mechanism being operated by said feed-means and the feed-mechanism.

2. A device as specified in claim 1, in which the compensating mechanism is effective only when there is a difference in speed between the feed-means and feed-mechanism.

3. In apparatus of the character set forth: a bat-machine provided with a conveyer for delivering a continuous bat; an upholstery machine provided with a conveyer for receiving said bat; and a compensating mechanism disposed between said machines for synchronizing their work and supporting said bat, comprising an endless belt conveyer on a movable carriage, one fixed driving member for said belt in driving connection with the first mentioned conveyor, a second fixed driving member in driving connection with the second mentioned conveyer, and means operable by said carriage for controlling the operation of one of said machines.

4. A device as specified in claim 3, in which the means for controlling the operation of one of said machines comprises a solenoid-operated clutch provided with starting and stopping electrical switches operable by the carriage.

5. A device as specified in claim 3, in which the means for controlling the operation of one of said machines comprises a clutch adapted to be actuated by solenoids electrically connected to limit switches disposed in the path of the carriage, and additional switches are provided to automatically deenergize the solenoids after each operation thereof.

6. In apparatus of the character set forth: a bat-fabricator for forming and delivering a plurality of parallel continuous bats; a multi-pleater upholstery machine adapted to receive said bats and sew them into pleats formed between a lining fabric and pre-cut cover fabrics, said machine having a bat feeding mechanism adapted to operate intermittently to sever the batts at the junctions between the cover fabrics; and compensating means between the fabricator and multi-pleater for synchronizing their work by automatically actuating a driving clutch provided for the fabricator, said means comprising a travelling conveyer-belt carriage adapted to actuate limit switches connected in series with solenoids adapted to actuate an operating arm of said clutch, and cut-out switches connected in series with said solenoids and disposed so as to be actuated by said clutch arm when the latter is moved.

7. In apparatus of the character set forth: a bat-fabricating machine serving to fabricate and deliver a continuous bat; an upholstery making machine for utilizing said bat; a conveyer disposed so as to support and convey a variable length of continuous bat from one machine to the other; and means for automatically moving the conveyer bodily to vary the length of bat thereon according to the relative speeds of the two machines.

8. A device as specified in claim 7, in which the conveyer comprises an endless belt mounted on a traveling carriage.

9. A device as specified in claim 7, in which the conveyer comprises an endless belt mounted on a traveling carriage, and the means for moving the conveyer bodily comprises an endless belt having driving connections with both machines and the conveyer.

10. A device as specified in claim 7, including means for automatically stopping one of the machines when the conveyer is supporting a certain length of bat.

11. In apparatus of the character set forth, a bat supply machine for supplying bat material at a definite rate, a second machine for using said material at a definite rate but with recurrent interruptions, a carriage intermediate said machines, an endless conveyor movable bodily with said carriage, means effective on interruption of operation of said second machine to move said carriage toward said supply machine, and for simultaneously controlling travel of said conveyor to receive said material without tension thereon from said supply machine, and means effective upon accumulation of a predetermined amount of said material on said conveyor to stop said supply machine.

12. In apparatus of the character set forth, bat-supply means provided with a feed-means for delivering a continuous bat; a bat-treating machine provided with feed-mechanism for receiving said bat; an endless conveyor mounted on a carriage for movement bodily between said batt-supply means and said machine to convey and support a variable length of bat; and compensating mechanism to control the movement of said carriage, said compensating mechanism being operated by said feed-means and said feed-mechanism.

13. In apparatus of the character set forth, bat-supply means provided with a feed-means for delivering a continuous bat; a bat-treating machine provided with feed-mechanism for receiving said bat; an endless conveyor mounted on a carriage for movement bodily between said bat-supply means and said machine to convey and support a variable length of bat; and compensating mechanism to control the movement of said carriage, said compensating mechanism being operated by said feed-means and said feed-mechanism, said compensating mechanism including a driver for said conveyor driven from said feed mechanism, and a separate driver for said conveyor, whereby upon stoppage of said feed mechanism, said carriage is bodily moved.

14. In apparatus of the character set forth, a bat-supply machine for supplying bat material at a definite rate, a second machine for using said material at a definite rate but with recurrent interruptions, a carriage intermediate said machines, an endless conveyor movable bodily with said carriage, means effective on interruption of operation of said supply machine during operation of said second machine to move said carriage and control travel of said conveyor to supply said material to said second machine.

15. A supply device for supplying continuous bat material, a machine for using said bat material, a movable carriage intermediate said device and said machine, an endless conveyor on said carriage, means for intermittently interrupting operation of said machine, means effective upon interruption of said machine during operation of said device to move said conveyor toward said device to receive material thereon, means effective upon accumulation of a predetermined amount of material thereon to interrupt operation of said device, said second means being thereafter effective upon operation of said machine during interruption of said device to move said carriage in the opposite direction to supply said material to said machine, and other means effective upon withdrawal of a predetermined amount of said accumulated material to initiate operation of said device.

16. In apparatus of the character set forth, bat-supply means provided with a feed-means for delivering a continuous bat; a bat-treating machine provided with feed-means for receiving said bat; an endless conveyor mounted on a carriage for movement bodily between said bat-supply means and said machine to convey and support a variable length of bat; a sprocket at each end of said carriage for driving said conveyor; an endless chain having upper and lower runs connecting said sprockets; a pair of fixed driving sprockets in driving relation to said chain; each of said driving sprockets being driven in unison with one of said feed-means, whereby upon stoppage of either of said feed-means and its corresponding driving sprocket, said carriage is moved bodily in a direction to permit continued operation of said other feed-means.

17. In apparatus of the character set forth, bat-supply means provided with a feed-means for delivering a continuous bat; a bat-treating machine provided with feed-means for receiving said bat; an endless conveyor mounted on a carriage for movement bodily between said bat-supply means and said machine to convey and support a variable length of bat; conveyor drive means normally driving said conveyor so that the upper bat receiving surface thereof travels toward said first feed-means and discharges the bat over its end onto said second feed-means, said conveyor drive means comprising a sprocket on said carriage at each end of said conveyor in driving relation to said conveyor, and a chain spanning said sprockets and providing upper and lower runs therebetween; a drive sprocket driven in unison with said first feed-means and in mesh with the upper run of said chain; and a second stationary, rotatable drive sprocket driven in unison with said second feed-means and in mesh with the lower run of said chain.

18. In apparatus of the character set forth, a bat-supply machine for supplying bat material at a definite rate, a second machine for using said material at a definite rate but with recurrent interruptions, a carriage intermediate said machines, an endless conveyor movable bodily with said carriage, means effective on interruption of operation of either of said machines to move said carriage and to control travel of said conveyor in a manner to accumulate said bat on said conveyor without tension, or to discharge said bat without tension to said second machine, depending on which machine is stopped, for a limited period of time.

ALLISTER S. MITCHELL.